US007584117B2

(12) United States Patent
Bubner

(10) Patent No.: US 7,584,117 B2
(45) Date of Patent: Sep. 1, 2009

(54) ANALYSIS OF BUSINESS INNOVATION POTENTIAL

(75) Inventor: Darryl Bubner, Warrandyte Victoria (AU)

(73) Assignee: Wave Global Pty Ltd, Victoria (AU)

( * ) Notice: Subject to any disclaimer, the term of this patent is extended or adjusted under 35 U.S.C. 154(b) by 1155 days.

(21) Appl. No.: 10/466,419

(22) PCT Filed: Feb. 5, 2002

(86) PCT No.: PCT/AU02/00111

§ 371 (c)(1),
(2), (4) Date: Jul. 16, 2003

(87) PCT Pub. No.: WO02/063510

PCT Pub. Date: Aug. 15, 2002

(65) Prior Publication Data

US 2004/0054567 A1    Mar. 18, 2004

(30) Foreign Application Priority Data

Feb. 6, 2001   (AU)   .................................... PR2879

(51) Int. Cl.
*G06F 17/30* (2006.01)
(52) U.S. Cl. ........................................................ 705/10
(58) Field of Classification Search .................... 705/10
See application file for complete search history.

(56) References Cited

U.S. PATENT DOCUMENTS

| | | | | |
|---|---|---|---|---|
| 5,365,420 | A * | 11/1994 | Cadman ........................ | 363/50 |
| 5,684,964 | A * | 11/1997 | Powers et al. ................. | 705/11 |
| 5,737,494 | A * | 4/1998 | Guinta et al. ................. | 706/47 |
| 5,795,155 | A * | 8/1998 | Morrel-Samuels .......... | 434/107 |
| 6,007,340 | A * | 12/1999 | Morrel-Samuels .......... | 434/236 |
| 6,556,974 | B1 * | 4/2003 | D'Alessandro ............. | 705/10 |
| 6,877,034 | B1 * | 4/2005 | Machin et al. .............. | 709/223 |

OTHER PUBLICATIONS

Drew, Stephen A.W; Strategic Benchmarking: Innovation Practices in Financial Institutions. 1995. The International Journal of Bank Marketing. vol. 13, Issue 1.*

Lievens, Annouk; Moenaert, Rudy K.; Jegers, Rosette S.; Linking Communication to Innovation Success in the Financial Services Industry: A Case Study Analysis. 1999. International Journal of Service Industry Management. vol. 10, Issue 1.*

Ahmed, Pervaiz K.; Benchmarking Innovation Best Practice. 1998. Benchmarking for Quality Management & Technology. vol. 5, Issue 1.*

Douglas, Brain. Senior Executive Fellowship Report 1995-1996: Strategy & Leadership in Changing Organisations. 1996. Australian Taxation Office.*

Thompson, James J. Quality and Innovation at 3M: A Partnership for Customer Satisfaction. Winter 1993/1994. Tapping the Network Journal. vol. 4, Issue 3.*

Zhuang, Lee. Bridging the Gap Between Technology and Business Strategy: A Pilot Study on the Innovation Process. 1995. Management Decision. vol. 33, Issue 8. pp. 13-21.*

Al-Mashari, Majed; Zairi, Mohamed; BPR Implementation Process: An Analysis of Key Success and Failure Factors. 1999. Business Process Management Journal. vol. 5, Issue 1.*

Whitley, Roger; Parish, Trueman; Dressler, Ronald; Nicholson, Geoffrey. Evaluating R&D Performance Using the New Sales Ratio. Sep./Oct. 1998. Research Technology Management. vol. 41, Issue 5. pp. 20-22.*

Van Buren, Mark E.; A Yardstick for Knowledge Management. May 1999. Training & Development. May 1999. pp. 71-78.*

Kuczmarski, Thomas D.; Measuring Your Return on Innovation. Spring 2000. Marketing Management. vol. 9, Issue 1. pp 24-32.*

Freeman, Tom; Assessing the Innovation Capacity of the Consortium: An Evaluation of the CAM-I Cost Management Systems Program. 1999. Journal of Knowledge Management. vol. 3, Issue 1.*

\* cited by examiner

*Primary Examiner*—Jonathan G. Sterrett
*Assistant Examiner*—Peter Choi
(74) *Attorney, Agent, or Firm*—Connolly Bove Lodge & Hutz LLP

(57) ABSTRACT

A method of determining a business's innovation capability consists of using a computer and internet based system which has a questionnaire program to obtain answers relating to 6 foundation capabilities and 6 innovation capabilities which are weighted and transformed by an algorithm into a value index which is used by management to improve innovation performance and by management and investors to forecast future growth and profitability of the business.

2 Claims, No Drawings

ANALYSIS OF BUSINESS INNOVATION POTENTIAL

This invention relates to a method of determining a measure of a business's potential for innovation as an aid to business management and as a measure of a business's potential to achieve a high return on investment from the business.

BACKGROUND TO THE INVENTION

Analysis of business risk and predicting the likelihood of a business performing in the future are difficult tasks that are increasingly in demand by investors and business managers.

WO98/20438 discloses a needs analysis computer system which consists of a program providing questions with yes no answers, a program providing appropriate responses to the answers and means to select a degree of importance of each response the selections being stored in memory and an output of proposed actions being provided at the conclusion of the program. This program is suitable for small business assistance but does not predict future performance.

WO0011671 discloses a system of matching entrepeneurs with investors using a communication network and includes data to enable investors to assess the entrepeneur.

WO0034911 discloses a system for depicting the effect of business decisions on market value. The system classifies assets into tangible and intangible asset categories and models market value as a function of these categories.

WO0068861 discloses a benchmarking analysis system in which a benchmark provider receives appropriate data from number of suppliers and then the data is analyzed on a weighted basis keyed to the suppliers status in the industry and then compared to the industry averages. The supply of the data and the benchmark report at regular intervals aids business decision making.

WO0073945 discloses a method for making a loan based on an intangible asset such as intellectual property. This enables a lender to assess the value and liquidity of the intangible asset.

These recent developments do touch on the importance of intellectual capital but do not measure the performance of the process that produces intellectual capital. Innovation has come to be seen as essential to a business using its intellectual capital to develop new products, processes and designs to achieve growth in sales and achieve and maintain a high rate of return on investment [ROI]. The process of innovation and the key factors for successful innovation are becoming better understood but the implementation and management of innovation policies are difficult.

What is needed is a means of evaluating innovation performance so that progress can be tracked over time. Such a measure should not only be useful for managers wanting to benchmark and improve their performance but also for investors to use as a guide in comparing a company to its competitors and in predicting future earnings and ROI.

It is an object of this invention to provide a measure of innovation capability.

BRIEF DESCRIPTION OF THE INVENTION

To this end the present invention provides for use with a computer or a computer network, a system of measuring innovation capability for use in managing a business or assessing valuation of a business consisting of a) a survey questionnaire to be completed by a plurality of personnel in the business in which groups of questions correlate with one or more of a multiplicity of factors related to innovation capability b) an answer database for storing and assembling answers to the questionnaire and creating a value for each answer c) optionally, a recommendation database of recommendations for improving performance based on existing factor scores d) a first algorithm for converting the sum of the answer values to each question into a score e) a second algorithm for summing the scores for answers in each group into a score for each innovation factor f) a third algorithm for summing the scores of all the factors into a value index which is indicative of the business's potential return on investment g) a display program for presenting the values for each factor and the value index h) and optionally a program utilising the factor scores and the value index for generating from said recommendation database, recommendations to management for improving the innovation capability of the business.

Preferably the system utilises the internet and questionnaires are answered on line. The system may be used to diagnose the innovation capabilities of a business and to improve the innovation performance by generating a prioritised set of recommendations based on an analysis of the answers and the factor scores.

The subject of the questions constituting each innovation factor are key indicators of the effectiveness of the organisation in the factor. When all factors are resourced adequately and managed effectively the organisation optimises the application of assets applied to innovation. The performance of an organisation at innovation is dependent on the effective utilisation of resources devoted to innovation plus the effective utilisation of resources used to manage all other processes and relations within the organisation.

Preferably the first algorithm weighs the answer values of selected questions and calculates the mean and median scores for all questions.

The second algorithm preferably sums the weighted mean scores for questions associated with each factor into a score for that factor

DETAILED DESCRIPTION OF THE INVENTION

This invention uses a generic open system model of business organisations which evaluates the six capabilities which are here called the foundation capabilities:

1. General management, which integrates the other five factors
2. Strategy for the business and competitive strategy
3. Environmental scanning
4. Marketing and sales
5. Production/operations
6. Administration including finance IT and human resources.

These capabilities overlap with each other but also operate in dynamic tension because in some situations they have differing and even opposing purposes. As conventionally practised, these capabilities do not necessarily involve innovation and may even be used to prevent innovation. Businesses That score well on these six capabilities do not necessarily grow and achieve above average ROI. Business growth derives from the creation of value through the development of new products or methods and new business designs which are generally a result of purposeful innovation. To predict future earning potential it is necessary to have an assessment of a business's innovation potential. Innovation potential depends on how well the innovation capabilities are developed and managed.

This invention is partly predicated on the realisation that innovation capabilities are essentially subsets of the foundation capabilities. The six innovation capabilities are:
1. Leadership
2. Innovation strategy
3. Fostering innovation via the external environment which involves the purposeful use of external data, relations and networks as sources of ideas and innovation.
4. Internal environment for innovation. The job designs, organisational structure decision making and reward systems that foster creative thinking and problem solving while also providing the framework for routine work processes.
5. The innovation production process which is essentially create, capture, assess, apply. This is the process of idea generation and application which can be in conflict with the firm's production process because production focuses on efficiency and innovation focuses on adaptation
6. Maintenance and measurement of innovation In the context of businesses and organisations understood as open systems the six innovation capabilities are in "natural" conflict or creative tension with the six foundation capabilities.

The utilisation of resources for the foundation and innovation capabilities gives an insight into the potential of a business to generate earnings growth and above average ROI.

The preferred algorithm for determining the value index V is:

$$V = IR/100[w1+w2+w3+w4+w5+w6] + FR/100[W1+W2+W3+W4+W5+W6] + P[\text{Revenue/Market capitalisation}]$$

Where:

The optionally additional component P[Revenue/Market capitalisation] is a measure of the impact of innovative business system designs on the performance of a business as such designs can have a dramatic impact on ROI. P is a number between 1 and 5 derived from data collected from the business.

$w1, 2, 3, 4, 5, 6$ and $W1, 2, 3, 4, 5, 6$ are the innovation and foundation capabilities expressed as a weighted percentage representing the effectiveness and impact of resource utilisation for the respective capability and is derived from the weighted average of a set of questions in the survey questionnaire.

For foundation capabilities the weightings are:

| | |
|---|---|
| W1 Management | 7.5% |
| W2 Strategy | 25% |
| W3 Environmental Scanning | 2.5% |
| W4 Marketing | 20% |
| W5 Production | 35% |
| W6 Administration | 10% |

For Innovation capabilities the weightings are

| | |
|---|---|
| w1 leadership | 7.5% |
| w2 strategy | 20% |
| w3 scanning | 5% |
| w4 internal environment | 20% |
| w5 innovation process | 40% |
| w6 measurement | 7.5% |

IR is the % of resources devoted to innovation and is based on R & D expenditure and estimates of expenditure on other specified types of innovation derived fro the answers to the audit including time devoted to innovation.

FR is the % of resources allocated to foundation activities
And IR+FR=100

Additional weights Y and Z [which have empirically determined values between 1 and 10] may be added to the w1 and W1 factor weights to take account of the relatively high impact of leadership and management as a result of these functions having a coordinating and integrating role in relation to all other functions and extraordinary effects such as the effect of CEO departure on stock prices.

The value index measurement can be assessed at intervals of 6 months or more to give an overall view of the progress of the business.

The value index can also be used to forecast Innovation Potential Rank [IPR] which is an indicator of performance two years from the time of measurement. The forecast algorithm is based on the fact that companies that currently apply more resources to innovation than their competitors and better manage the resources they apply will, with the exception of extraordinary events outperform their competitors in the medium term.

In order to create a score for each innovation factor and each foundation factor answers to sets of questions relating to each factor are scored and financial and other data on the business being measured are collected.

Indicative questions for each factor are given below. These questions are written for senior managers. Other questions are written so that they can be answered by any employee. Most questions are phrased as statements that respondents rate on a scale.

Sample Questions

Management Factor

Both successful and unsuccessful projects are reviewed. Reviews focus on lessons that can be learned and insights gained Across the company there is excellent communication between technical/R & D personnel and commercial/marketing personnel Managers in our company know how to set up, lead and maintain effective teams Leadership Factor Managers, from the top down, draw employees' attention to the value of ideas, creative thinking and innovation by what they say and what they do This company has enough people with the qualities required to lead innovative projects and ventures. (e.g. making things happen, handling ambiguity and uncertainty, building stakeholder support)

Strategy Factor

Our managers agree on the major opportunities, threats and constraints facing the company in the next few years Our managers know what our competitive advantage is and also how our core competencies underpin that advantage Strategy for Innovation Factor Our company's vision, value and strategy documents set out clear demands and opportunity areas for innovative thinking and action (e.g. creating new customers, markets, products, services, ventures or alliances)

People in our company know what its main sources of growth will be in the next few years and use this knowledge to develop and assess innovative business cases/investment proposals External Scanning Factor Our managers know how to assess the impacts of trends and discontinuities beyond the immediate industry environment (e.g. long term technological, social trends)

Our managers and supervisors tell staff about external trends and developments (opportunities and threats) and also engage them in thinking about responses.

External Environment for Innovation Factor

The company has leading edge customers and suppliers and works with them in value creating partnerships The company actively monitors the products, services and strategies of competitors with a view to imitating and/or bettering them Marketing Factor Rate the quality and effectiveness of brand building and management Rate the quality and effectiveness of marketing and sales strategies, plans and programs Internal Environment Factor Our organisational structure (reporting relations, roles, authorities, delegations) allows and encourages individuals and teams to take initiative and to try out new ideas The company actively recognises people who find and apply valuable innovative ideas.

Production/Operations Factor

Quality thinking and practices are embedded in the company and help to maintain and improve its performance Rate the efficiency and responsiveness of production/operations Capture, Assess, Apply Factor Our company is know and respected for its research leadership The company knows how and where to facilitate breakthrough thinking Where I work there are effective ways of capturing ideas and suggestions I know how to use stories and metaphors to present novel ideas and proposals Administration Factor When I need to, I can get a rich supply of information on our products, processes, projects and performance Only reviewed, high value materials go into our online knowledge system.

Measurement & Maintenance of Innovation Factor

The company is developing ways to measure the value of its intangible assets (brands, knowledge, intellectual capital, patents, etc.)

Managers and staff in the areas of accounting, personnel and finance recognise and support the activities that foster innovation, even when additional or unusual demands are involved.

Validity Testing

Eleven organisations, seven companies and five public sector organisations completed the WAVE audit.

The appropriate personnel—senior executives and a cross section of middle managers completed the questionnaires. In some cases all personnel from a Division of a large organisation completed the audit.

One of the limitations of the research was the small sample—only eleven organisations took part. Another unavoidable limitation arises from the fact that one of the audit questionnaires collects data only from senior executives, and there are typically a very small number of these—between 4 and 20 in most companies and business units. Many statistical tests of significance require a moderate number of responses and the small number of responses, eg less than ten, limited the power of the tests in some cases.

Content Validity

The conventional method for establishing content validity, ie that the instrument is measuring what it purports to measure is by literature reviews and research analysis. In the case of WAVE extensive reviews of existing instrument measuring quality and business excellence were conducted. The literature on innovation was also reviewed.

Construct Validity

The first three hypotheses were aimed at establishing the construct validity of the instrument. The tests were aimed assessing whether expected relations between various parts of the models were confirmed by the data.

The first hypothesis tested was that performance on innovation activities factors (V factors) would be lower than performance on the foundation factors (F factors).

The test was applied to all six factor scores on both Managers and Employees data.

The rationale for the hypothesis is that companies and organisations are better at designing and managing "Foundation" activities than "Innovation" activities because they have been doing it for much, much longer. The management of innovation, encompassing product, process, R & D, and business design innovation is in its infancy, as a codified field of practice, and there are very few theories or models.

For the Managers data, many of the differences between F and V scores for the factors were significant, with V being significantly higher than F scores. There were only a few cases in which the reverse was true (e.g. for some the companies on the External factor).

For the Employee data there were quite a few significant differences recorded, with F scores being superior to V scores for the majority of factors. There was one exception, as the mean V scores for the External factor tended to dominate over the F scores.

Nearly all cases in which the hypothesis was not confirmed related to the function "External Environment" the items (questions) in the instrument used to construct the External Environment" function were examined. The full description of this function is "Using sources of ideas and knowledge from the external environment, such as people in networks that are cultivated to stimulate creative and innovative concepts".

The second hypothesis was that the Managers would have higher scores on the six factors than Employees. The factor scores analyzed were the means of both V and F items for four of the six factors.

It was expected that senior managers would give more positive ratings of performance than their subordinates on most areas measured, especially in less well managed companies.

There was good support for the second hypothesis across three of the four factors.

The unexpected findings on the "External environment" factor are explained by the comment made previously.

The third hypothesis was that innovation performance over the past three years (question 2) would be lower than overall performance over the same period. (Question 1). It was expected that in most cases the management of innovation would not be as strong as overall management and performance.

This Hypothesis was supported in six of the eleven companies.

When analysing the data in the context of knowledge of the companies, it became apparent that situational factors, such as a decline or very weak improvement in performance over the previous three years, would limit support for this hypothesis to companies where there had been moderate to high improvement in overall performance.

Predictive Validity

The fourth hypothesis was that Managers' expectation (question 3) of future performance based on innovation is correlated with the aggregate factor score for all of the V items, that is, the overall innovation capabilities across the company. A significant correlation indicates that there is a relationship between Managers' expectations of future performance and current innovation capabilities The correlations between current innovation and future performance ranged from moderate to high and were significant for seven companies. Small sample sizes meant that results for three other organisations were inconclusive.

The fifth hypothesis was that composite WAVE scores (called the Index) would indicate the future performance of profit based organisations. This hypothesis is the most important of all. The key test of the accuracy of a measure is its relationship against an independent external measure. This hypotheses could only be measured some time after the data was collected. The results are shown in the table 1.

The invention claimed is:

1. A computer network based method of measuring innovation capability for use in managing a business or assessing valuation of a business which includes the following steps:
   (a) conducting a survey over a computer network of managers and employees in a business in which groups of survey questions, requiring answers that are rated on a scale, correlate with one or more of a plurality of factors, wherein said factors are related to business foundation capability and innovation capability, wherein business foundation capability factors are selected from General management, Strategy for the business and competitive strategy, Environmental scanning, Marketing and sales, Production/operations, and Administration, and innovation capability factors are selected from Leadership, Innovation strategy, Fostering innovation, Internal environment of organizational structure and reward systems, Innovation production process, and Maintenance and measurement of innovation;
   (b) assembling, by a central processor, the answers based on said scale in a central database and creating a value for each answer in a central processor;
   (c) converting, by said central processor, the sum of the answer values to each question into a score for foundation capabilities using a first algorithm;

TABLE 1

WAVE Audit Scores compared with actual performance one year later (Return on Total Assets) for 8 companies. Correlation 0.74

| Company Code | Foundation Scores | Innovation Scores | Foundation Resources % | Innovation Resources % | WAVE INDEX | Return on Assets 00/01* | Executive Forecast Accurate? |
|---|---|---|---|---|---|---|---|
| 1 | 64 | 51 | 0.95 | 0.05 | 6.34 | 1.6 | Yes |
| 2 | 64.8 | 53 | 0.90 | 0.10 | 6.36 | 3.1 | Sample too small |
| 3 | 67.5 | 54.5 | 0.95 | 0.05 | 6.69 | 9.9 | Yes |
| 4 | 70 | 57 | 0.95 | 0.05 | 6.94 | 5.9 | Yes |
| 5 | 66 | 58 | 0.90 | 0.10 | 6.52 | 10.8 | Sample too small |
| 6 | 67 | 56 | 0.95 | 0.05 | 6.65 | 11.5 | Yes |
| 7 | 73.5 | 67 | 0.80 | 0.20 | 7.22 | 12.6 | Yes |
| 8 | 75 | 60 | 0.90 | 0.10 | 7.35 | 14.7 | Yes |

This table only includes profit based companies. Other organisations that took part in the research and were included in other statistical tests were government departments.
*Financial data is taken from published sources. Australian Financial Review and Business Review Weekly and from information supplied when published data was not available.

The data collected was from both very large companies and medium sized autonomous business units of large companies involved in diverse industry sectors including power utilities, chemical processing, control instrumentation, medical instruments, banking and telecommunications.

A highly simplified version of the algorithm was used to calculate the single figure index. The average of all foundation and all innovation factors were multiplied by an estimate of the resources applied to each. No weights or adjustments were applied.

The correlation of 0.74 obtained is considered high by statisticians.

Despite the diverse industries and competitive conditions faced by the companies, and the simplified formula used, the WAVE measure for these companies has a strong relationship with financial performance.

From the above it can be seen that the present invention provides a unique system for assisting businesses to improve innovation performance and measure the performance in a way that is not only meaningful for managers but also for investors.

(d) summing, by said central processor, the scores for answers in each group into a score for each innovation capability using a second algorithm;
(e) summing, by said central processor, the scores of all the factors into a value index which is indicative of the business's potential return on investment using a third algorithm;
(f) said third algorithm for the index value is $$V = IR/100[w1+w2+w3+w4+w5+w6] + FR/100[W1+W2+W3+W4+W5+W6]$$

Where w1, 2, 3, 4, 5, 6 and W1, 2, 3, 4, 5, 6 are the innovation and foundation capabilities expressed as a weighted percentage representing the effectiveness of resource utilization for the respective capability and is derived from the weighted average of a set of questions in the survey questionnaire;

IR is the % of resources devoted to innovation and is based on R&D expenditure+New Product Development expenditure;

FR is the % of resources allocated to foundation activities; and

IR+FR=100; and (g) generating, by said central processor, predetermined recommendations relevant to each score for improving the innovation capability of the business using the factor scores and the value index.

2. A method as claimed in claim 1 which additionally includes (a) a recommendation database of recommendations for improving performance based on existing factor; and (b) a program in said central processor utilizing the factor scores and the value index for generating from said recommendation database, recommendations to management for improving the innovation capability of the business.

* * * * *